United States Patent [19]

Kawada et al.

[11] 3,821,807

[45] June 28, 1974

[54] MAGNETIC TAPE RECORDING AND REPRODUCING APPARATUS OPERABLE WITH TAPE CARTRIDGE AND HAVING FAST FORWARD MECHANISM

[75] Inventors: Toshio Kawada, Neyagawa; Tadashi Torama, Osaka; Tamio Kobayashi, Hirakata, all of Japan

[73] Assignee: Matsushita Electric Industrial Co., Ltd., Kadoma-shi, Osaka, Japan

[22] Filed: Sept. 26, 1972

[21] Appl. No.: 292,318

[30] Foreign Application Priority Data

| | | |
|---|---|---|
| Sept. 30, 1971 | Japan | 46-76973 |
| Sept. 30, 1971 | Japan | 46-76974 |
| Sept. 30, 1971 | Japan | 46-76975 |
| Sept. 30, 1971 | Japan | 46-76976 |
| Sept. 30, 1971 | Japan | 46-76977 |

[52] U.S. Cl. ...................... 360/93, 274/4 D, 360/73

[51] Int.Cl. ...................... G11b 15/28, G11b 15/46, G11b 23/04

[58] Field of Search .............. 179/100.2 Z, 100.2 T, 179/100.2 R; 242/55.19 A; 274/4 B, 4 D

[56] References Cited

UNITED STATES PATENTS

| | | | |
|---|---|---|---|
| 3,485,500 | 12/1969 | Loeschner et al. | 179/100.2 Z |
| 3,559,908 | 2/1971 | Esashi | 179/100.2 Z |
| 3,603,595 | 9/1971 | Wada | 179/100.2 Z |
| 3,633,920 | 1/1972 | Ban | 179/100.2 Z |
| 3,665,117 | 5/1972 | Staar | 179/100.2 Z |
| 3,677,555 | 7/1972 | Vail | 179/100.2 Z |
| 3,688,058 | 8/1972 | Findlay | 179/100.2 Z |

*Primary Examiner*—Alfred H. Eddleman
*Attorney, Agent, or Firm*—Stevens, Davis, Miller & Mosher

[57] ABSTRACT

A magnetic tape recording and reproducing apparatus having a tape fast forward mechanism and a recording mechanism, and being operable with an endless tape cartridge, which is so designed that a fast forward switch is inoperable after the apparatus has been placed in a recording position upon switching a recording-reproduction selector switch by the operation of a recording lever.

4 Claims, 5 Drawing Figures

MAGNETIC TAPE RECORDING AND REPRODUCING APPARATUS OPERABLE WITH TAPE CARTRIDGE AND HAVING FAST FORWARD MECHANISM

This invention relates to a magnetic tape recording and reproducing apparatus operable with an endless tape cartridge.

Conventional magnetic tape recording and reproducing apparatus operable with endless tape cartridges have been capable of only reproduction and, therefore, there has been an increasing demand in recent years for an apparatus which has both a recording function and a tape fast forwarding function.

It is an object of the present invention to provide a magnetic tape recording and reproducing apparatus of a simple construction and a low price which comprises a recording mechanism and a tape fast forward mechanism.

It is another object of the invention to provide a magnetic tape recording and reproducing apparatus operable with an endless tape cartridge, which comprises a fast forward switch for increasing the rotational speed of a capstan to obtain a tape fast forward operation, a recording lever for operating a recording-reproduction selector switch to shift the electrical circuit of the apparatus into a recording position, a locking mechanism for maintaining the electric circuit in the recording position after actuation of said recording-reproduction selector switch by said recording lever, and an operating member operatively associated with said recording lever and the operating portion of said fast forward switch, said operating member being brought into engagement with the operating portion of said fast forward switch incident to the operation of said recording lever to shift the electric circuit into the recording position, rendering said fast forward switch inoperable during the recording operation.

An embodiment of the apparatus of this invention will be described with reference to the accompanying drawings, in which.

Figure 1:
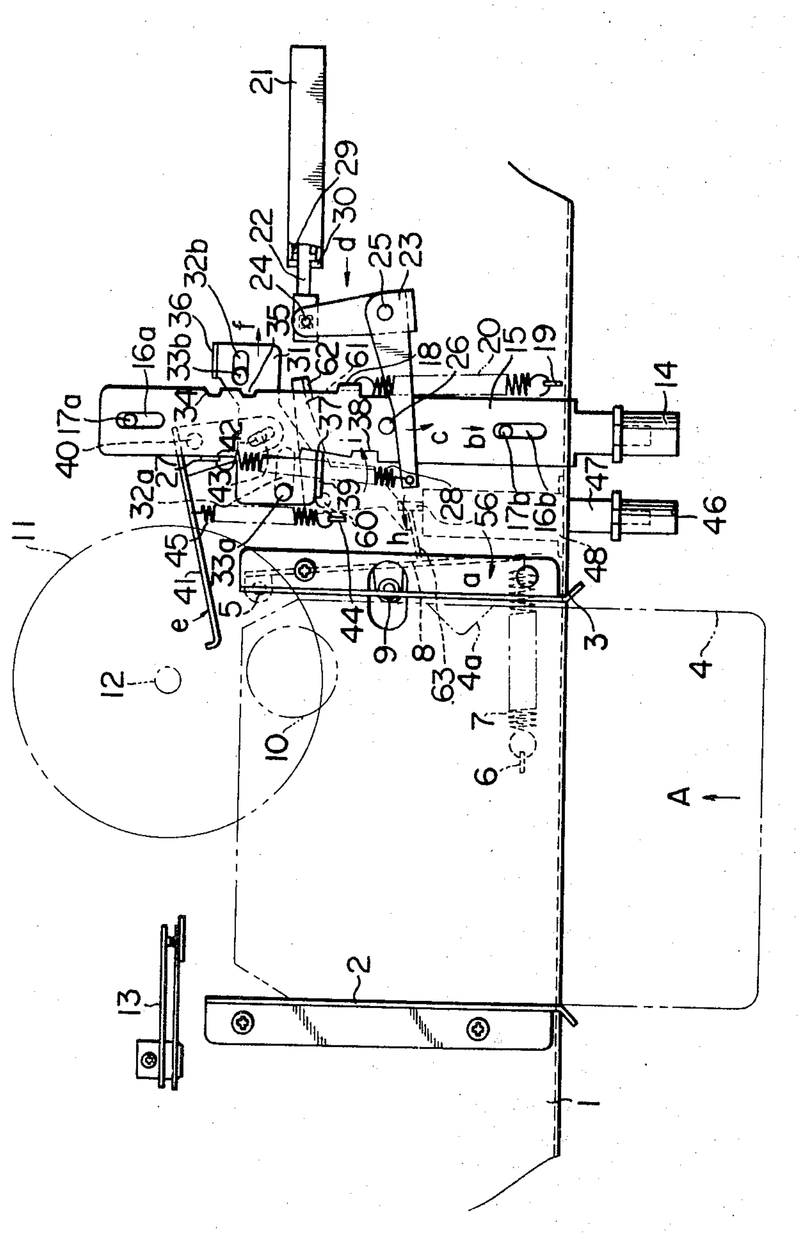
FIG. 1 is a top plan view showing the positions of the internal mechanisms of an embodiment of the invention in a state wherein a tape cartridge is being inserted.

Referring to the drawings, reference numeral 1 designates a base plate. On the base plate 1 are provided guide members 2, 3 for guiding an endless tape cartridge 4 which is inserted into the apparatus in the direction of the arrow A. A positioning lever 8 has one end pivotally mounted on a pivot 5 fixed on the base plate 1 and is biased in the direction of the arrow *a* by a spring 7 extended between the other end of said positioning lever 8 and a projecting lug 6 formed on the base plate 1. When the tape cartridge 4 has been inserted to a predetermined depth, it is set in position by the positioning lever 8, with a roller 9 carried on said positioning lever being received in a notch 4a formed in said cartridge.

With the tape cartridge 4 positioned by the roller 9, a pinch roller 10 provided in said tape cartridge 4 urges the tape into pressure contact with a capstan 12 integral with a 11. Concurrently with the positioning of the tape cartridge, a current is conducted to a motor and other electric circuits, so that a switch 13 is closed and the tape is driven by the rotating capstan 12.

On the other hand, a recording lever 15 having a recording button 14 at the outer end thereof is slidably mounted on the base plate 1, with pins 17*a*, 17*b* fixed on said base plate 1 being received in slots 16*a*, 16*b* formed in said recording lever respectively, and is normally biased in the direction of the arrow *b* by a spring 20 having one end anchored to a bent lug 18 formed on said lever and the other end anchored to a projecting lug 19 formed on said base plate.

An operating rod 22 of a recording-reproduction selector switch 21 is pivotally connected to one end of a link lever 23 by a pin 24 and said link lever 23 is pivotally connected at its bent portion to the base plate 1 by a pin 25. The other end portion of the link lever 23 is opposed by a pin 26 provided on the recording lever 15. The link lever 23 and the recording lever 15 are resiliently connected with each other by a spring 28 extended between a projecting lug 27 formed on said recording lever and the other end of said link lever, whereby said link lever 23 is held in pressure contact with the pin 26 on the recording lever 15 under the biasing force of the spring 28. Thus, the spring 20 biasing the recording lever 15 in the direction of the arrow *b* urges through the pin 26 the link lever 23 to rotate in the direction of the arrow *c*, causing the operating rod 22 of the recording-reproduction selector switch 21 to move in the direction of the arrow *d* to shift the electric circuit into a reproduction position.

In this case, the movement of the recording lever 15 in the direction of the arrow *b* is limited through the link lever 23 by a flange 29 provided on the operating rod 22 of the recording-reproduction selector switch 21 and abutting against an end wall 30 of said switch 21, and therefore, one ends of the slots 16*a*, 16*b* of the recording lever 15 are not engaged by the pins 17*a*, 17*b* respectively. A locking lever 31 is arranged below the recording lever 15, with pins 33*a*, 33*b* fixed on the base plate 1 being received in slots 32*a*, 32*b* formed in said locking lever respectively. This locking lever 31 is slidable in a direction perpendicular to the sliding direction of the recording lever 15, and is formed with a bent lug 36 which will be selectively engaged in two notches 34, 35 formed in one side edge of the recording lever 15 and also with a bent lug 39 which will be contacted by an oblique portion 37 of the other side edge of the recording lever 15 and will be received in a notch 38 formed continuously forwardly of said oblique portion 37.

On the other hand, a detector lever 41 is provided on the base plate 1, which is pivotably supported on said base plate at its bent portion by a pin 40. One end of the detector lever 41 is extended into the insertion path of the tape cartridge 4 and the other end thereof is formed with a slot 42 in which is received a pin 43 fixed on the locking lever 31. This detector lever 41 is urged to rotate in the direction of the arrow *e* by a spring 45 which is extended between said detector lever 41 and a projecting lug 44 formed on the base plate 1. Thus, it will be understood that the locking lever 31 is urged to move in the direction of the arrow *f*, with the bent lug 39 thereof being in pressure contact with the oblique portion 37 of the recording lever 15.

Figure 5:
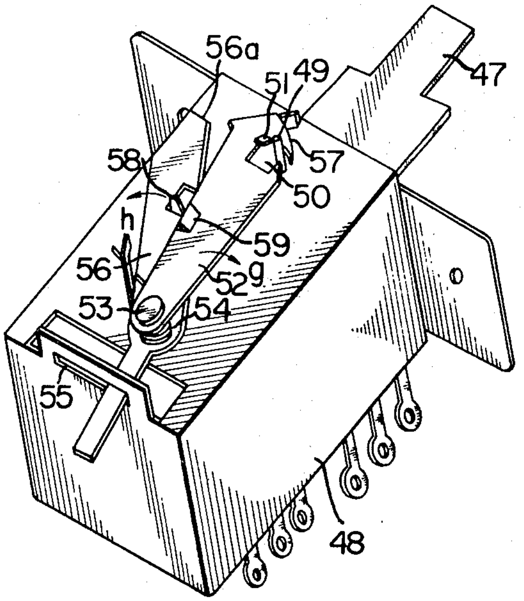
FIG. 5 is a perspective view of the fast forward switch.

For increasing the rotational speed of the capstan 12 and thereby obtaining a tape fast forward operation, a fast forward switch 48 is provided which is actuated when a switch rod 47 is pushed by a fast forward button 46. This fast forward switch 48 is attached to the underside of the base plate 1 and, as shown in FIG. 5, comprises a casing, a pin 49 fixed on the switch rod 47 to be carried thereby and projecting from one side of said casing, a ratchet plate 52 having a notch 50 for receiving said pin 49 and an oblique member 51 disposed in said notch 50, said ratchet plate 52 being pivotally mounted on a pin 53 fixed on said casing, a spring 54 biasing said ratchet plate 52 to rotate in the direction of the arrow *g* and an operating member 56 pivotally mounted on said pin 53 with one end thereof projecting outwardly from the rear end of said casing, and being biased to rotate in the direction of the arrow *h* by said spring 54, the pivotal movement of said operating member 56 being limited by a guide slot 55. The pin 49 is normally in engagement with forward edge 57 of the ratchet plate 52 but, when the switch rod 47 is pushed in and the pin 49 is brought into registration with the notch 50 of said ratchet plate 52, said ratchet plate 52 makes a pivotal movement in the direction of the arrow *g* under the biasing force of the spring 54 and the pin 49 is latched by the inner edge of the notch 50 as shown, whereby said switch rod 47 is held in its pushed in position and the tape fast forward operation is carried out. When the switch rod 47 is pushed again in this state, the pin 49 is released from engagement with the inner edge of the notch 50, allowing the ratchet plate 52 to make a pivotal movement further in the direction of the arrow *g* under the biasing force of the spring 54, and thus the oblique member 51 is brought to a position opposite to said pin 49. Therefore, when the pressure is removed from the switch rod 47, the pin 49 returns to its original position while sliding on the sloped surface of said oblique member 51 and pushing the ratchet plate 52 upwardly.

Further, with the switch rod 47 being held in its pushed in position, when the operating member 56 is turned in a direction opposite to the direction of the arrow *h* against the biasing force of the spring 54, the ratchet plate 52 is pushed upward by a lug 58 formed at a portion of the operating member 56 and engaging an oblique lug 59 formed at one side edge of said ratchet plate 52, so that said ratchet plate 52 releases the pin 49 from engagement therewith, similarly allowing the switch rod 47 return to its original position.

While the operating member 56 is being in the position to push up the ratchet plate 52 after it has been turned in the direction opposite to the direction of the arrow *h* against the biasing force of the spring 54, the edge 56a of said operating member 56 is in contact with the pin 49 and thus the inward movement of the switch rod 47 is prevented by the operating member 56.

A pivot lever 61 is pivotably supported at its central portion on the base plate 1 by a pin 60. This pivot lever 61 is formed at one end with a bent lug 62 which is opposed by the bent lug 18 of the recording lever 15 to be engaged thereby, and at the other end with a bent lug 63 which is located between the back surface of the positioning lever 8 and the operating member 56 of the fast forward switch 48 to be engaged thereby.

Now, the operation of the apparatus constructed as described above will be described.

With the recording lever 15 being in its outwardly projected stationary position and the switch rod 47 of the fast forward switch 48 also being in its outwardly projected position, when the tape cartridge 4 is inserted, the roller 9 and the positioning lever 8 carrying said roller are caused to make a pivotal movement in a direction opposite to the direction of the arrow *a* by the side surface of said tape cartridge 4 against the biasing force of the spring 7, and the detector lever 41 is caused to make a pivotal movement in a direction opposite to the direction of the arrow *e* by the end face of said tape cartridge against the biasing force of the spring 45, until finally said cartridge 4 is positioned in situs by the roller 9 engaging in the recess 4*a* of the tape cartridge 4.

Figure 2:
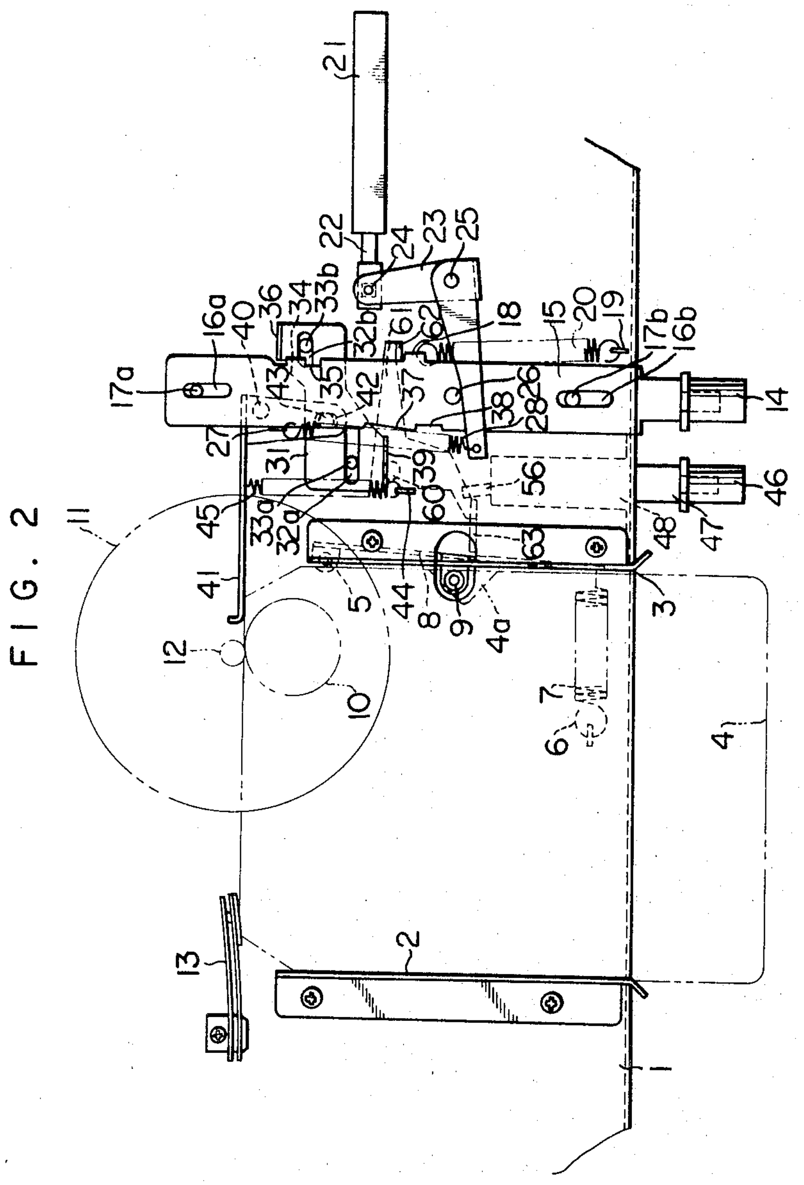
FIG. 2 is a top plan view, similar to FIG. 1 but showing the positions of the mechanisms in a reproducing state.

In this position of the tape cartridge, the switch 13 is closed connecting the electric circuit with a power source, so that the capstan 12 starts rotating to drive the tape in cooperation with the pinch roller 10 and to carry out the reproduction operation, as shown in FIG. 2.

The pivotal movement of the positioning lever 8 in the direction opposite to the direction of the arrow *a*, occurring during insertion of the tape cartridge 4, results in a pivotal movement of the pivot lever 61 in the direction of the arrow *i*, with its bent lug 63 being engaged by said positioning lever 8, which in turn results in a pivotal movement of the operating member 56 of fast forward switch 48 in the direction opposite to the direction of the arrow *h* against biasing force of the spring 54. Therefore, the switch rod 47 of the fast forward switch will be returned to its outwardly projecting position, even if said switch rod 47 is previously pushed in through the fast forward button 46 and thereby the electric circuit is in the fast forward position before the insertion of the tape cartridge 4. Thus, it will be understood that the reproduction operation can always be obtained upon insertion of the tape cartridge 4, no matter in what position the fast forward switch 48 may be before the insertion of the cartridge.

On the other hand, in the state of reproduction shown in FIG. 2, the detector lever 41 is pivoted in a direction opposite to the direction of the arrow *e* and thereby the locking lever 31 is shifted in a direction opposite to the direction of the arrow *f*, with its bent lug 36 being received in the notch 34 of the recording lever 15, so that the recording lever 15 locked in its position by the locking lever 31 and hence the apparatus cannot be shifted from the reproduction state directly to the recording state.

Figure 3:
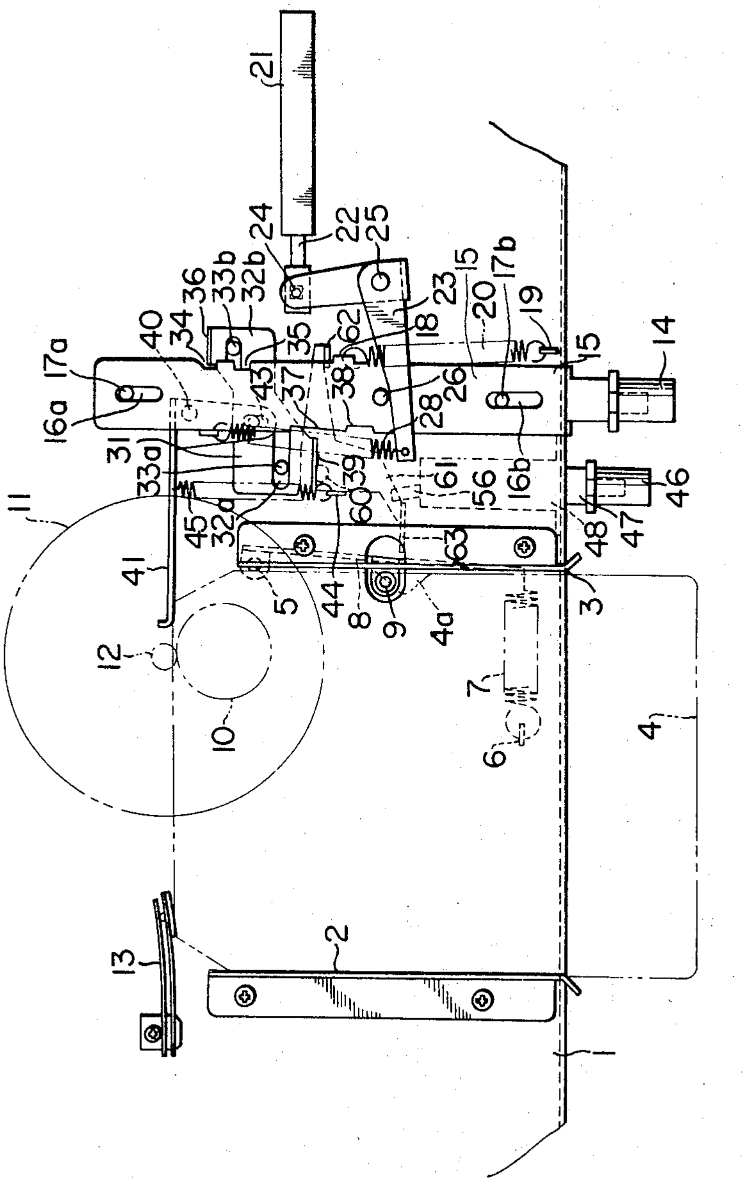
FIG. 3 is a top plan view, similar to FIG. 1 but showing the positions of the mechanisms in a fast forward state.

Now, when the switch rod 47 of the fast forward switch 48 is pushed in through the fast forward button 48, as shown in FIG. 3, in the state of reproduction, it is held in the pushed in position by the ratchet plate 52, whereby the fast forward switch 48 is held in its actuated position to carry out tape fast forward operation. Then, when the fast forward button 46 is pushed again, the engagement between the pin 49 and the ratchet plate 52 is released, so that the switch rod 47 is returned to its original position and the fast forward operation is ended and the reproduction operation is resumed.

In the fast forward operation with the switch rod 47 being in its pushed in position, when the tape cartridge 4 is drawn out, the roller 9 rides on the side surface of said cartridge 4, causing a pivotal movement of the positioning lever 8 in the direction of the arrow *a* against the biasing force of the spring 7 and a pivotal movement of the pivot lever 61 in the direction of the arrow *i*, so that the operating member 56 of the fast forward switch 48 is pivoted by the bent lug 63 of said pivot lever 61 in the direction opposite to the direction of the arrow *h*, whereby the ratchet plate 52 is pushed up by said operating member and the pin 49 is released from latched engagement with the ratchet plate 52, allowing the switch rod 47 to return to its original position, and thus the fast forward operation is ended. In this case, the motor is stopped and the other electric circuits are disconnected from the power source, because the switch 13 is opened concurrently with the withdrawal of the tape cartridge 4.

Next, the recording operation will be described. When the recording lever 15 is pushed in through the recording button 14 against the biasing force of the spring 20 before the recording operation is carried out or with no tape cartridge inserted in the apparatus, the oblique edge portion 37 of said recording lever is brought into engagement with the bent lug 39 of the locking lever, incident to the movement of said recording lever 15 in a direction opposite to the direction of arrow *b*, and causes said locking lever 31 to move in the direction opposite to the arrow *f* against the biasing force of the spring 45 being applied to said locking lever through the detector lever 41, until finally the bent lug 39 of the locking lever 31 is received in the notch 38 of the recording lever 15. Thus, the recording lever 15 is locked in its pushed in position by the locking lever 31.

On the other hand, the pin 26 also moves in the direction opposite to the direction of the arrow *b* by being carried on the recording lever 15, so that the link lever 23 is released from restrainment by said pin 26 and makes a pivotal movement in a direction opposite to the direction of the arrow *c* under the biasing force of the spring 28, causing the operating rod 22 of the recording-reproduction selector switch 21 to move in a direction opposite to the direction of the arrow *d*, whereby the electric circuit is shifted into the recording position.

The arrangement is made such that the electric circuit is connected with the power source before the recording operation is actually carried out, through a switch (not shown) which is connected in parallel with the switch 13 and actuated by the recording lever 15 when said recording lever is pushed in, so that the recording level may be adjusted preparatory to the recording operation.

Further, when the recording lever 15 is pushed in, its bent lug 18 abuts against the bent lug 62 of the pivot lever 61, causing said pivot lever 61 to make a pivotal movement in the direction of the arrow *i* and in turn, the bent lug 63 of said pivot lever 61 causes the operating member 56 of the fast forward switch 48 to make a pivotal movement in the direction opposite to the direction of the arrow *h*. As a result, the edge 56a of the operating member 56 is shifted to a position opposite to the pin 49, so that, with the recording lever 15 being in its pushed position, the fast forward operation cannot be obtained by pushing the fast forward button 46.

With the recording lever 15 being locked in its pushed in position by the locking lever 31, when the tape cartridge 4 is inserted, the roller 9 is pivotally shifted, together with the positioning lever 8, in the direction opposite to the direction of the arrow *a* against the biasing force of the spring 7 and finally the tape cartridge 4 is positioned in situs, with said roller 9 received in the recess 4*a* of said cartridge, but in the event when the recording lever 15 has been pushed in and locked in its position by the locking lever 31 before the insertion of the cartridge, the detector lever 41 is in the same position as when the recording lever 15 is not pushed in, so that the insertion of the cartridge 4 in this state results in a pivotal movement of the detector lever 41 in the direction opposite to the direction of the arrow *e* against the biasing force of the spring 45 and hence in a movement of the locking lever 31 in the direction opposite to the direction of the arrow *f*. Thus, the recording lever 15 is released from restrainment by the bent lug 39 of the locking lever 31 and returns to its original position under the biasing force of the spring 20.

Such arrangement is effective for preventing the recording operation from being carried out against the user's will when the tape cartridge 4 is inserted, with the recording lever casually being placed in its pushed in position.

Figure 4:
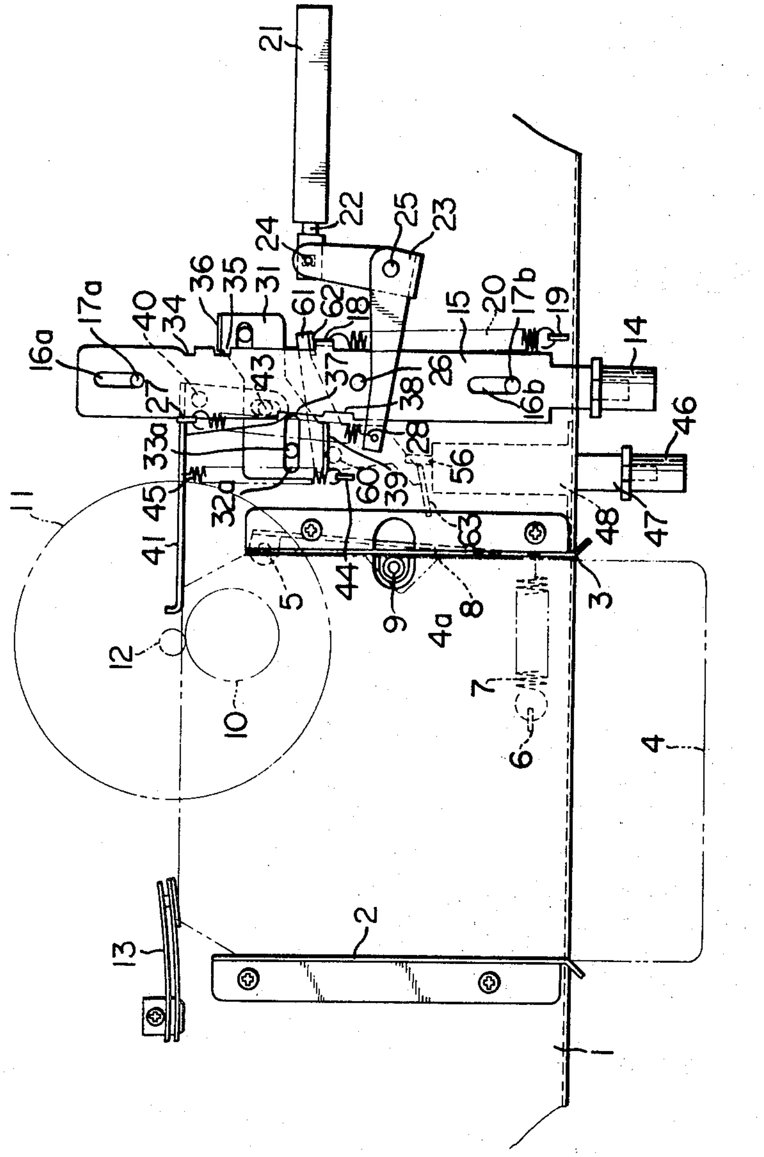
FIG. 4 is a top plan view, similar to FIG. 1 but showing the position of the mechanisms in a recording state.

Because of such arrangement, it is necessary for obtaining the recording operation, to insert the tape cartridge 4 while holding the recording lever 15 in its pushed in position in the event when said recording lever 15 as been in the pushed in position prior to the recording operation, or after the recording lever 15 has been pushed in manually in the event when said recording lever 15 has not previously been in the pushed position. Namely, when the tape cartridge 4 is inserted, with the recording lever 15 manually being held in its pushed in position, and is positioned in situs by the roller 9, the detector lever 41 is caused by the end surface of the cartridge to make a pivotal movement in the direction opposite to the direction of the arrow *e* against the biasing force of the spring 45 and thereby the locking lever 31 is caused to move in the direction opposite to the direction of the arrow *f*, with the result that the bent lug 36 of said locking lever 31 is received in the notch 35 of said recording lever 15. Thus, the recording lever 15 is held in its pushed in position by the locking lever 31 throughout the recording operation, even if the pressure is removed therefrom, because said locking lever 31 is retained in its shifted position by the tape cartridge 4 as shown in FIG. 4.

In this case, the operating member 56 of the fast forward switch 48 is caused to make a pivotal movement by the bent lug 63 of the pivot lever 61 in the direction opposite to the direction of the arrow *h*, similar to the case wherein the recording lever 15 is pushed in before the insertion of the tape cartridge 4, so that during the recording operation it is impossible to push the switch rod in through the fast forward button 46 and accordingly it is impossible to shift the operation of the apparatus from the recording operation directly to the fast forward operation.

The recording operation terminates when the tape cartridge is drawn out. Namely, when the tape cartridge 4 is drawn out, the detector lever 41 makes a pivotal movement in the direction of the arrow *e* under the biasing force of the spring 45, incident to the withdrawal of said cartridge 4 and hence the locking lever 31 makes a return movement in the direction of the arrow *f*, releasing the recording lever 15 from the locked state. Therefore, the recording lever 15 returns to its original position under the biasing force of the spring 20 and the operating rod 22 of the recording-reproduction selector switch 21 also returns to its original position, shifting the electric circuit into the state of reproduction.

On the other hand, when the tape cartridge 4 is drawn out, the switch 13 is opened and the recording lever 15 returns to its original position as stated above, so that the switch controlled by said recording lever is also opened to render the apparatus inoperative.

The reproduction, fast forward and recording operations are carried out in the manner described above.

In the outwardly projecting position of the recording lever 15, the movement of said recording lever 15 in the direction of the arrow *b* under the biasing force of the spring 20 is restrained by the engagement between the operating rod 22 and the end wall 30 of the recording-reproduction selector switch 21, so that, while the recording-reproduction selector switch 21 is being in the position to hold the electric circuit in the state of reproduction, its operating rod 22 can be retained in its position stably and positively under the biasing force applied thereto through the link lever 23, whereas while said selector switch 21 is being in the position to place the electric circuit in the state of recording, its operating rod 22 can be retained in its position also stably and positively because, in this case, said operating rod 22 is urged toward the end of its stroke opposite to the end wall 30 under the biasing force of the spring 28 applied thereto through the link lever 23 as a result of the pin 26 of the recording lever 15 being disengaged from said link lever 23.

This is advantageous in that the recording-reproduction selector switch 21 can be secured in its selected position with stability, without undergoing the influence of vibration or shock and a stable operation of the apparatus can be obtained even when the apparatus is mounted in an automobile or the like.

What we claim is:

1. A magnetic tape recording and reproducing apparatus operable with an endless tape cartridge having a pinch roller, comprising a. a base, said base including means for receiving said cartridge, b. a capstan rotatably mounted with respect to said base for driving said pinch roller when said cartridge is fully inserted in said apparatus, c. a fast forward switch including a manually actuated switching member and a displaceable operating member secured to said base, said operating member when displaced preventing said switching member from being actuated, d. a recording lever moveably mounted on said base, e. a recording - reproduction selection switch actuated by said recording lever, said switch having an operating means, f. locking means mounted on said base adjacent said recording lever and operatively connected thereto for locking said recording lever in its engaged position, g. operating means moveably mounted on said base for engagement with said recording lever and said operating member, said operating means displacing said operating member when said recording lever is in its engaged position thereby rendering said fast forward switch inoperable during the recording operation, and h. positioning means moveably mounted on said base plate for engagement with said cartridge and operating member, said positioning means displacing said operating member when said cartridge is partially inserted in said apparatus thereby rendering said fast forward switch inoperable.

2. A magnetic tape recording and reproducing apparatus according to claim 1 which further comprises detection means mounted on said base plate for engagement with said cartridge and said locking means, said detection means displacing said locking means to permit locking of said recording lever in its engaged position when said cartridge is fully inserted in said apparatus.

3. A magnetic tape recording and reproducing apparatus according to claim 2 wherein said locking means comprises a locking lever having first and second engaging portions, and said recording lever has first, second and third engaging portions, said locking lever and said recording lever being displaceable against the biasing forces of first and second springs respectively, the first and second engaging portions on said recording lever being engageable with the first engaging portion on said locking lever and said third engaging portion on said recording lever being engageable with the second engaging portion on said locking lever, the arrangement being such that a. when said recording lever is operated to operate said recording reproduction selector switch before the insertion of the tape cartridge, the third engaging portion thereof is engaged by the second engaging portion of said locking lever and thereby said recording lever is retained in its operative position, b. when the tape cartridge is inserted with said recording lever being retained by the locking lever, said locking lever is displaced by said detection means and the second engaging portion of said locking lever is released from engagement with the third engaging portion of the recording lever, c. when the tape cartridge is inserted before the recording lever is operated, the locking lever is displaced by said detection means which is displaced by said tape cartridge and the first engaging portion of said locking lever is engaged by the first engaging portion of said recording lever whereby said recording lever is rendered inoperative and d. when the tape cartridge is inserted after the recording lever is operated, the locking lever is displaced and the first engaging portion thereof is brought into engagement with the second engaging portion of said recording lever, whereby said recording lever is retained in its operative position.

4. A magnetic tape recording and reproducing apparatus according to claim 1 which further comprises a second spring biasing said recording lever in one direction, said locking means retaining said recording lever in the position to which said recording lever is moved against the biasing force of said second spring; an engaging element mounted on said recording lever; a link lever coupled to the operating means of said recording-reproduction selection switch; and a third spring for urging said link lever into pressure contact with the engaging element of said recording lever, the movement of said recording lever under the biasing force of said second spring being limited by one end of the limited stroke of the operating means of the recording-reproduction selection switch, and the engaging element of said recording lever being disengaged from the link lever and the operating means of said recording reproduction switch being shifted to the other end of its limited stroke and held stationary in its position under the biasing force of said third spring while said recording lever is being retained in its operative position by said locking means.

* * * * *